United States Patent
Macias

(10) Patent No.: US 12,407,405 B2
(45) Date of Patent: Sep. 2, 2025

(54) SYSTEMS AND METHODS FOR CONDITIONAL HANDOVER USING NON-TERRESTRIAL NODE TELEMETRY INFORMATION

(71) Applicant: Verizon Patent and Licensing Inc., Basking Ridge, NJ (US)

(72) Inventor: John F. Macias, Antelope, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 294 days.

(21) Appl. No.: 18/068,052

(22) Filed: Dec. 19, 2022

(65) Prior Publication Data

US 2024/0204862 A1    Jun. 20, 2024

(51) Int. Cl.
*H04B 7/185* (2006.01)
*H04W 36/08* (2009.01)
*H04W 36/24* (2009.01)

(52) U.S. Cl.
CPC ........ *H04B 7/18513* (2013.01); *H04W 36/08* (2013.01); *H04W 36/083* (2023.05); *H04W 36/24* (2013.01)

(58) Field of Classification Search
CPC ........... H04B 7/18513; H04B 7/18541; H04W 36/08; H04W 36/083; H04W 36/24; H04W 36/322; H04W 36/085; H04W 36/087; H04W 36/13; H04W 36/247; H04W 36/249
See application file for complete search history.

(56) References Cited

U.S. PATENT DOCUMENTS

| | | | |
|---|---|---|---|
| 10,805,850 B1 * | 10/2020 | Benammar | H04W 36/144 |
| 2023/0041601 A1 * | 2/2023 | Vangala | H04W 36/328 |
| 2024/0244517 A1 * | 7/2024 | Lee | H04W 48/20 |

OTHER PUBLICATIONS

Third Generation Partnership Project, "Technical Specification Group Services and System Aspects; Study on using Satellite Access in 5G; Stage 1 (Release 16)," TR 22.822 V16.0.0 (Jun. 2018).
Third Generation Partnership Project, "Technical Specification Group Radio Access Network; NR; NR and NG-RAN Overall Description; Stage 2 (Release 17)," 3GPP TS 38.300 V17.2.0 (Sep. 2022).
"Technical Specification Group Radio Access Network; Study on Narrow-Band Internet of Things (NB-IoT) / enhanced Machine Type Communication (eMTC) support for Non-Terrestrial Networks (NTN) (Release 17)", Third Generation Partnership Project, 3GPP TR 36.763 V17.0.0 (Jun. 2021).

* cited by examiner

*Primary Examiner* — Ji-Hae Yea

(57) ABSTRACT

A device described herein, such as a User Equipment ("UE"), may connect to a base station of a wireless network, receive telemetry information associated with a plurality of Non-Terrestrial Network ("NTN") nodes, identify a particular handover condition, select, based on identifying the particular handover condition, a particular NTN node of the plurality of NTN nodes, initiate a handover procedure from the first base station of the wireless network to the selected particular NTN node, and connect to the particular NTN node based on the handover procedure. The NTN nodes may be implemented by satellites that orbit the Earth.

18 Claims, 14 Drawing Sheets

US 12,407,405 B2

SYSTEMS AND METHODS FOR CONDITIONAL HANDOVER USING NON-TERRESTRIAL NODE TELEMETRY INFORMATION

BACKGROUND

Wireless networks provide wireless connectivity to user equipment ("UE"), such as mobile telephones or other wireless communication devices. Wireless networks may include wireless network infrastructure, such as ground-based base stations, which may be installed on buildings, towers, or other structures. Some wireless networks may include Non-Terrestrial Networks ("NTNs"), which may utilize satellites or other machines, equipment, etc. that orbit the Earth and which may not have a fixed position relative to the ground.

DETAILED DESCRIPTION OF EXAMPLE EMBODIMENTS

The following detailed description refers to the accompanying drawings. The same reference numbers in different drawings may identify the same or similar elements.

Embodiments described herein provide for a UE to detect handover conditions and initiate handovers to and/or from NTN nodes, such as satellites or other wireless network infrastructure equipment that orbits the Earth and/or is otherwise mobile and/or airborne. For example, as discussed below, a UE may receive NTN telemetry information, based on which the UE may select a particular NTN node, and may initiate a handover to the selected particular NTN node. In this manner, the wireless coverage provided by a wireless network may be enhanced to include connectivity to NTN nodes. Further, since embodiments described herein afford UEs the opportunity to detect handover conditions (e.g., based on UE-detected signal strength metrics, UE-determined latency or other performance metrics, UE-determined application or traffic types, etc.), the options available to UEs to initiate handovers (e.g., handover targets) may be widened by the availability of NTN nodes, thus enhancing the coverage of wireless services offered to UEs.

Figure 1:
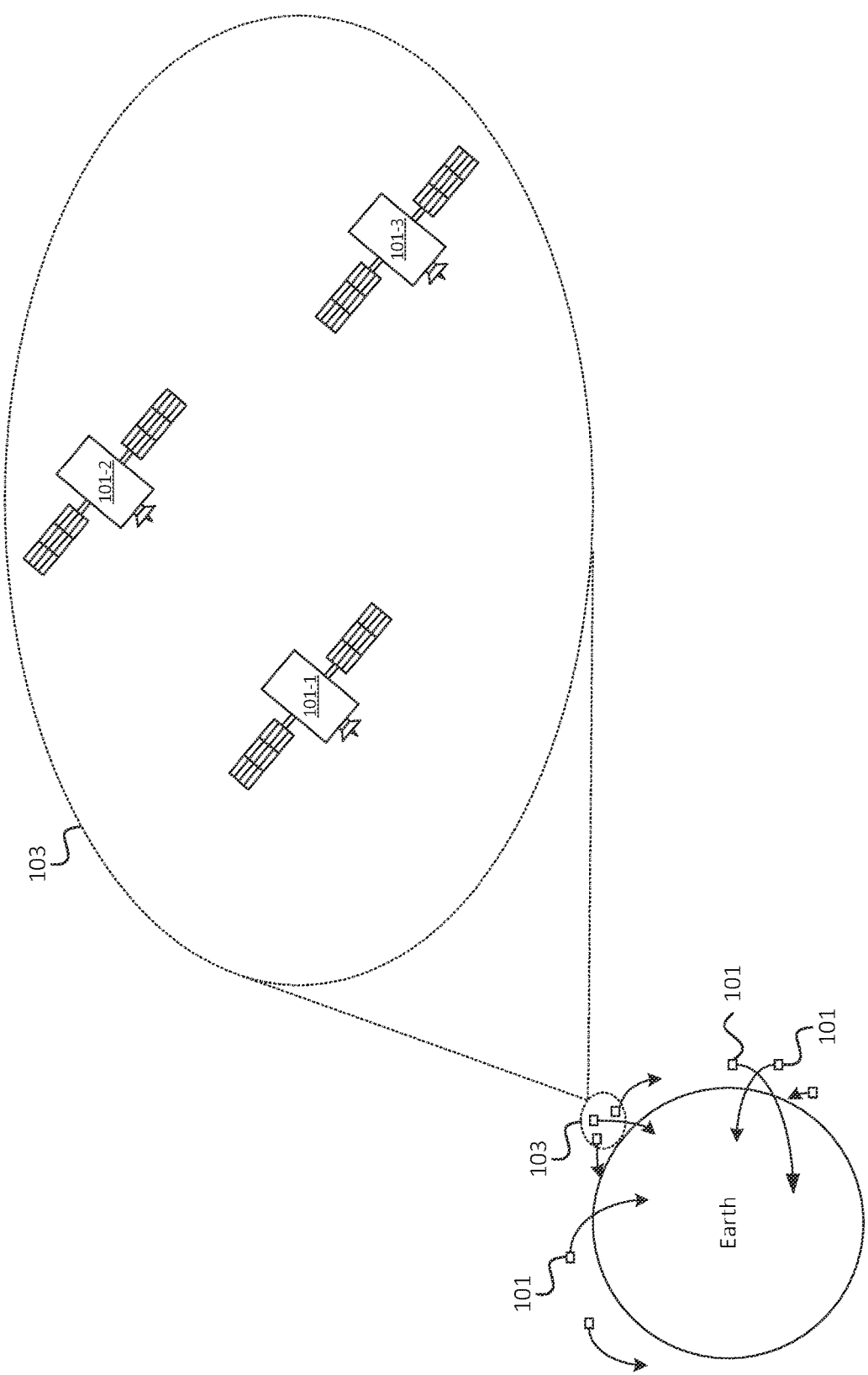
FIG. 1 illustrates an example of a group of NTN nodes.

As shown in FIG. 1, multiple NTN nodes 101 may orbit the Earth and/or may otherwise be mobile and/or airborne. As discussed above, NTN nodes 101 may include and/or may be implemented by satellites and/or other suitable apparatus that includes wireless network infrastructure equipment (e.g., radios, antennas, etc.). NTN nodes 101 may implement, for example, a base station of RAN, a Distributed Unit ("DU") of a RAN, and/or some other element of a wireless network that provides a wireless interface between UEs, such as mobile phones, Internet of Things ("IoT") devices, etc. and a core network (e.g., an Evolved Packet Core ("EPC"), a Fifth Generation ("5G") core ("5GC"), etc.). In the examples described herein, each NTN node 101 is described as being implemented by a single satellite or other suitable apparatus. However, concepts similar to those described herein apply to other arrangements or implementations, such as implementations in which a single satellite or other suitable apparatus implements multiple NTN nodes 101.

As further shown in FIG. 1, a set of NTN nodes may be associated with a particular NTN node group 103. For example, NTN node group 103 may include NTN nodes 101 that are configured to communicate with each other and/or otherwise to receive information associated with each other, such as telemetry information as discussed below. In some implementations, NTN node group 103 may be referred to as, or implemented by, a "constellation" of satellites. In some embodiments, NTN node group 103 may not be a predetermined group, but may instead refer to a set of NTN nodes 101 that are within a threshold proximity of each other (e.g., within wireless communication range of each other). For example, NTN nodes 101 of NTN node group 103 may be "neighbors" of each other, inasmuch as NTN nodes 101 of NTN node group 103 may be located physically closer to each other than other NTN nodes 101 (e.g., other NTN nodes 101 that are orbiting the Earth).

Figure 2:
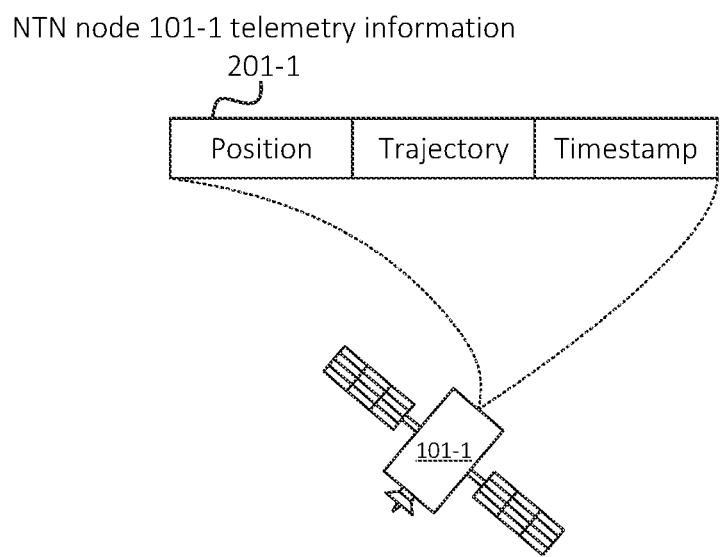
FIGS. 2 and 3 illustrate an example of telemetry information, associated with respective NTN nodes, that the NTN nodes may each maintain.

Each NTN node 101 may generate, receive, or otherwise maintain a set of telemetry information, "ephemeris" information, etc. (referred to herein simply as "telemetry information" for the sake of brevity). For example, as shown in FIG. 2, NTN node 101-1 may maintain a respective set of NTN node telemetry information 201-1. NTN node telemetry information 201-1 may include, for example, a current position of NTN node 101-1 and a trajectory of NTN node 101-1. The current position may be expressed in terms of latitude and longitude coordinates, altitude, and/or other suitable position information indicating where NTN node 101-1 is in relation to a reference point or line on the Earth (e.g., the North Pole, the Equator, the Prime Meridian, sea level, etc.). The trajectory may be expressed in terms of heading, speed, target location(s) and predicted or estimated time of arrival, a flight plan, and/or other suitable information based on which a future location of NTN node 101-1 may be determined. In some embodiments, NTN node telemetry information 201-1 may include other suitable information describing telemetry of NTN node 101-1, such as angle, acceleration, or other suitable information. NTN node telemetry information 201-1 may be determined by NTN node 101-1 based on one or more onboard sensors, and/or may be received from some other source, such as a terrestrial-based control station, another NTN node 101, and/or some other suitable device or system. NTN node telemetry information 201-1 may also include a timestamp, indicating a time at which the position, trajectory, etc. have been determined.

Figure 3:
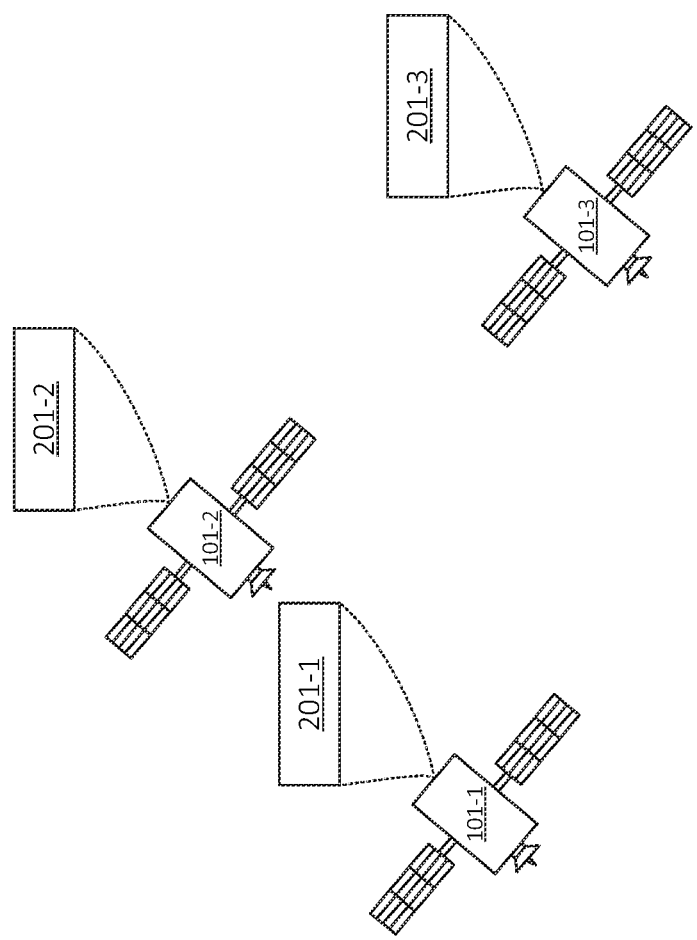
Figure 4:
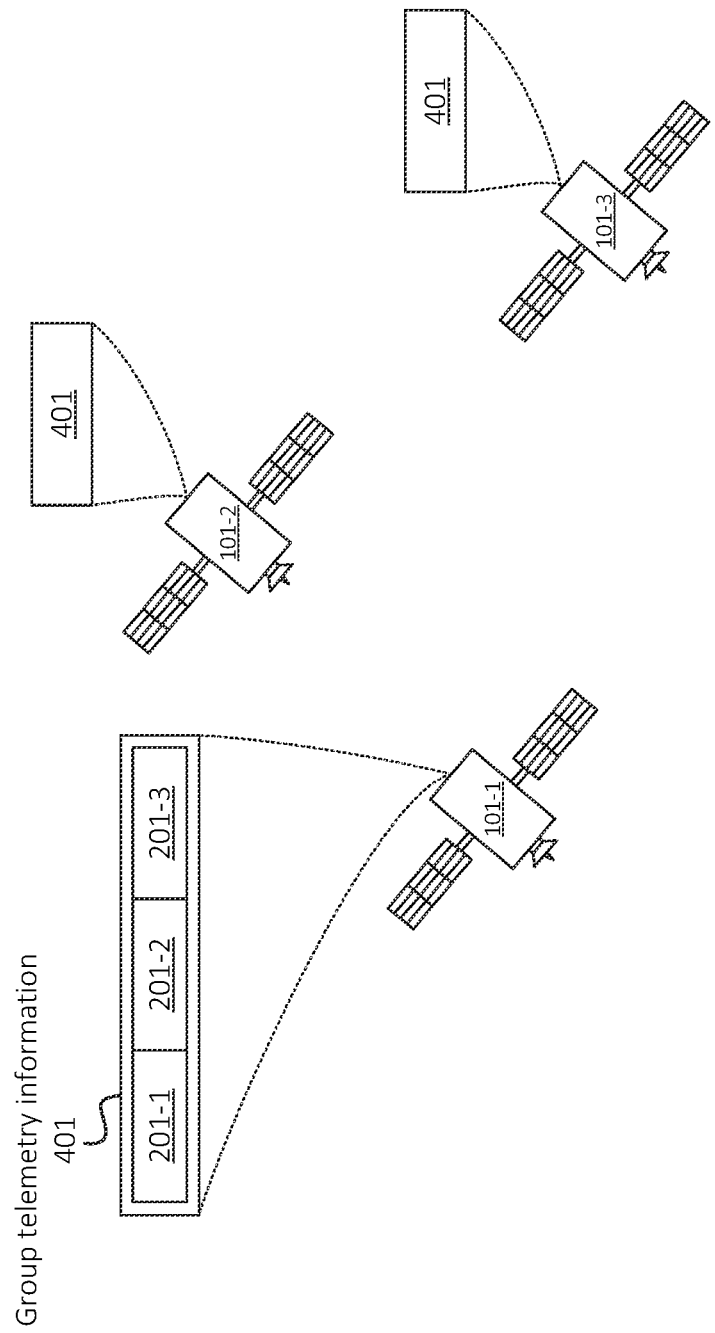
FIG. 4 illustrates an example of telemetry information, associated with multiple NTN nodes of a group, that each NTN node of the group may maintain.

In this manner, as shown in FIG. 3, each NTN node 101 (e.g., NTN nodes 101-1, 101-2, and 101-3) of NTN node group 103 may maintain its own respective NTN node telemetry information 201 (e.g., NTN node 101-2 may maintain NTN node telemetry information 201-2 and NTN node 101-3 may maintain NTN node telemetry information 201-3). Additionally, as shown in FIG. 4, each NTN node 101 of NTN node group 103 may maintain NTN node telemetry information 201 of some or all of the other NTN nodes 101 of NTN node group 103. In the example shown, NTN nodes 101-1, 101-2, and 101-3 may maintain a set of group telemetry information 401 (e.g., an "almanac"), which may include the respective NTN node telemetry information 201 of each NTN node 101 of NTN node group 103 (e.g., NTN node telemetry information 201-1, 201-2, and 201-3, in this example). For example, in addition to maintaining its own NTN node telemetry information 201-1, NTN node 101-1 may also maintain NTN node telemetry information 201-2 and 201-3 associated with NTN nodes 101-2 and 101-3, respectively. Similarly, in addition to maintaining its own NTN node telemetry information 201-2, NTN node 101-2 may also maintain NTN node telemetry information 201-1 and 201-3 associated with NTN nodes 101-1 and 101-3, respectively.

NTN nodes 101 may receive NTN node telemetry information 201 associated with other NTN nodes 101 by wirelessly communicating directly with such NTN nodes 101. For example, NTN nodes 101-1 and 101-2 may wirelessly communicate with each other in order for NTN node 101-1 to provide NTN node telemetry information 201-1 to NTN node 101-2, and for NTN node 101-2 to provide NTN node telemetry information 201-2 to NTN node 101-1. Additionally, or alternatively, NTN nodes 101 may communicate indirectly via one or more relays, such as ground-based devices or systems and/or via one or more other airborne devices or systems. For example, NTN node 101-1 may provide NTN node telemetry information 201-1 to such relay device or system, which may forward NTN node telemetry information 201-1 to NTN nodes 101-2 and/or 101-3. In some situations, group telemetry information 401 may include different versions of NTN node telemetry information 201 associated with respective NTN nodes 101. For example, NTN node telemetry information 201-2, maintained by NTN node 101-1, may be less up-to-date than NTN node telemetry information 201-2 as maintained by NTN node 101-2. For example, NTN node 101-2 may update a local copy of NTN node telemetry information 201-2 more frequently than NTN node 101-1 receives updated NTN node telemetry information 201-2.

Figure 5A:
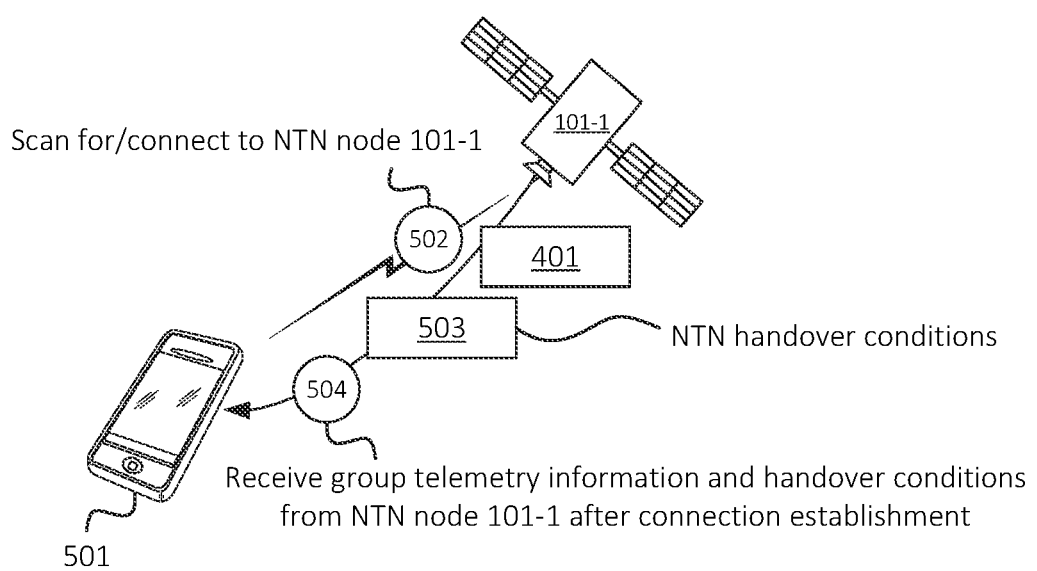
FIG. 5A illustrates an example of a UE receiving a set of handover conditions and NTN group telemetry information from an NTN node after connecting to the NTN node, in accordance with some embodiments.

As discussed herein, group telemetry information 401 and/or NTN node telemetry information 201 associated with one or more NTN nodes 101 may be used by a UE when detecting handover conditions, selecting handover targets, and initiating handovers to such handover targets. For example, as shown in FIG. 5A, UE 501 may scan for and connect (at 502) to NTN node 101-1. UE 501 may be an NTN-capable UE, inasmuch as one or more radios, antennas, etc. of UE 501 may operate according to the same frequency, frequency band, radio access technology ("RAT"), etc. implemented by NTN node 101-1.

In some implementations, UE 501 may scan for and connect (at 502) to NTN node 101-1 based on the absence of a ground-based base station. For example, prior to scanning (at 502) for NTN node 101-1 (e.g., attempting to locate wireless signals such as Master Information Blocks ("MIBs"), System Information Blocks ("SIBs"), timing and/or synchronization signals, presence signals, etc. outputted by one or more NTN nodes 101), UE 501 may have scanned for one or more ground-based base stations according to a frequency, frequency band, RAT, etc. implemented by such ground-based base stations. In such a situation, UE 501 may have not detected the presence of a ground-based base station, based on which UE 501 may scan (at 502) according to a frequency, frequency band, RAT, etc. associated with NTN nodes 101.

Connecting to NTN node 101-1 may include performing a Radio Resource Control ("RRC") connection setup, exchanging one or more RRC messages, etc. As part of, in conjunction with, or subsequent to the respective connection setup, NTN node 101 may request attributes, capabilities, etc. of UE 501. UE 501 may respond with an indication that UE 501 supports conditional handover procedures, and/or may respond with a request for conditional handover information.

In response to the indication that UE 501 supports conditional handover procedures, in response to the request for conditional handover information, and/or based on one or more other factors (e.g., based on the connection of UE 501 to NTN node 101-1), NTN node 101-1 may respond with a set of handover conditions 503. NTN handover conditions 503 may specify conditions based on which UE 501 may request a handover from NTN node 101-1 (or other NTN nodes 101 and/or wireless network infrastructure, including ground-based base stations) to another NTN node 101 and/or to some other wireless network infrastructure. NTN node 101-1 may, in some embodiments, receive NTN handover conditions 503 from a core network or some other suitable source.

As one example, NTN handover conditions 503 may specify that UE 501 should request a handover from a particular NTN node 101, to which UE 501 is connected, to another NTN node 101 if signal strength metrics between UE 501 and the particular NTN node 101 (e.g., as measured by UE 501) are below a first threshold and if signal strength metrics between UE 501 and the other NTN node 101 are above a second threshold. As another example, NTN handover conditions 503 may specify that UE 501 should request a handover from the particular NTN node 101, to which UE 501 is connected, to another NTN node 101 if a distance between UE 501 and the particular NTN node 101 (e.g., as determined by UE 501 based on receiving group telemetry information 401) is greater than a first threshold distance and if distance metrics between UE 501 and the other NTN node 101 is less than a second threshold distance.

As shown, NTN node 101-1 may also provide (at 504) group telemetry information 401, which may include NTN node telemetry information 201-1 associated with NTN node 101-1 as well as NTN node telemetry information 201 associated with one or more other NTN nodes 101 (e.g., NTN nodes 101 of the same NTN node group 103 as NTN node 101-1). In some embodiments, UE 501 may receive (at 504) group telemetry information 401 as part of, in conjunction with, or subsequent to the connection (at 502) of UE 501 to NTN node 101-1. In some embodiments, UE 501 may additionally receive, on an ongoing basis and while UE 501 is connected to NTN node 101-1, updated group telemetry information 401 (e.g., in the event that NTN node 101-1 receives updates to some or all of group telemetry information 401 over time, such as course changes or updated positions associated with NTN node 101-1 and/or one or more other NTN nodes 101). In this manner, UE 501 may be "aware" of the positions of NTN node 101-1 and one or more other NTN nodes 101 at any given time, including future times (e.g., based on a present position and trajectory of respective NTN nodes 101).

Figure 5B:
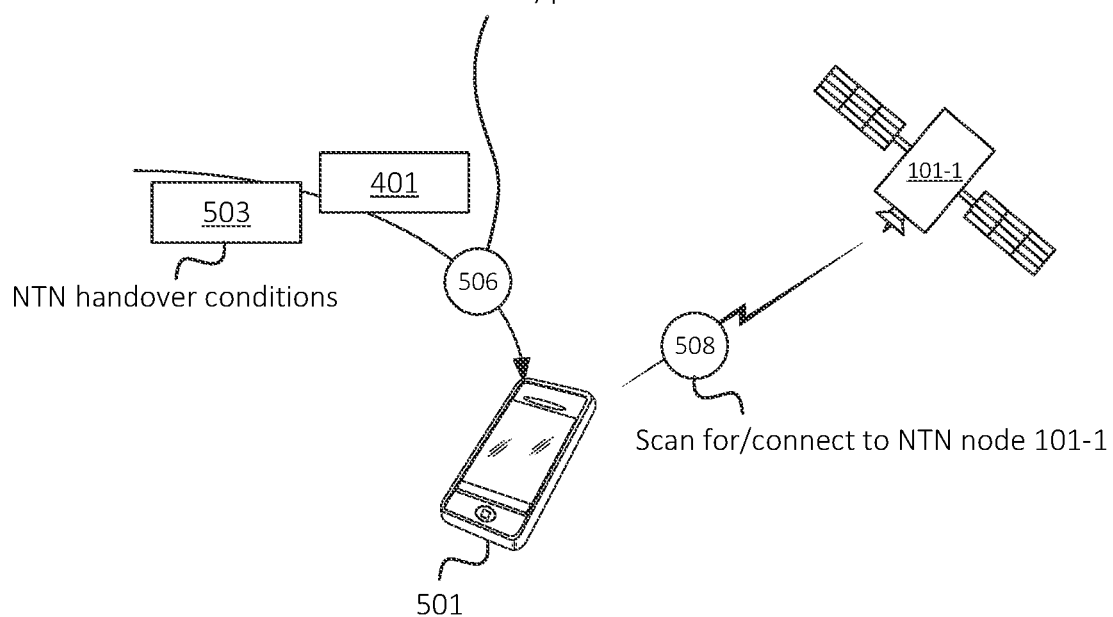
FIG. 5B illustrates an example of a UE receiving a set of handover conditions and NTN group telemetry information from an NTN node prior to connecting to the NTN node, in accordance with some embodiments.

In some embodiments, UE 501 may receive group telemetry information 401 and/or NTN handover conditions 503 without connecting to a given NTN node 101. For example, as shown in FIG. 5B, UE 501 may receive (at 506) NTN handover conditions 503 and/or group telemetry information 401 from a source other than NTN node 101-1, and/or from NTN node 101-1 prior to connecting to NTN node 101-1. For example, NTN node 101-1, a ground-based base station, and/or some other device or system may provide (at 506) NTN handover conditions 503 and group telemetry information 401 prior to UE 501 scanning for and connecting to (at 508) NTN node 101-1. In some embodiments, NTN node 101-1, another NTN node 101, and/or some other device or system may broadcast NTN handover conditions 503 and/or group telemetry information 401 as part of a MIB, SIB, or other type of control signaling. Additionally, or alternatively, NTN node 101-1, another NTN node 101, and/or some other device or system may broadcast NTN handover conditions 503 and/or group telemetry information 401 using a Multimedia Broadcast Multicast Service ("MBMS") technique, an evolved MBMS ("eMBMS") technique, and/or some other suitable type of broadcast technique. Additionally, or alternatively, UE 501 may have received (at 506) NTN handover conditions 503 and/or group telemetry information 401 during an initial provisioning procedure, an Over-the-Air ("OTA") update procedure, and/or via some other suitable procedure. Accordingly, based on the techniques described in FIG. 5A or 5B, and/or some other suitable technique, UE 501 may receive and maintain a set of NTN handover conditions 503 as well as group telemetry information 401 associated with one or more NTN nodes 101 (e.g., associated with one or more NTN node groups 103).

Figure 6:
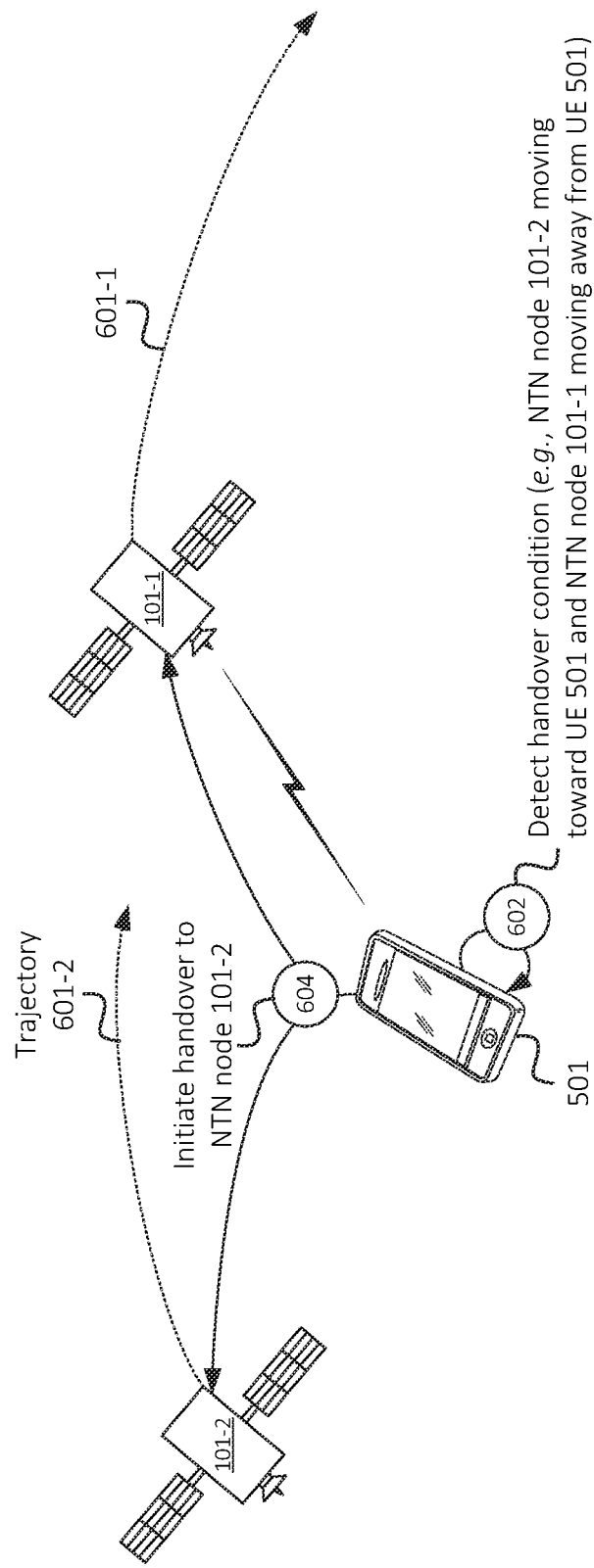
FIG. 6 illustrates an example of a UE detecting a handover condition based on conditional handover information and/or NTN group telemetry information, in accordance with some embodiments.
Figure 7:
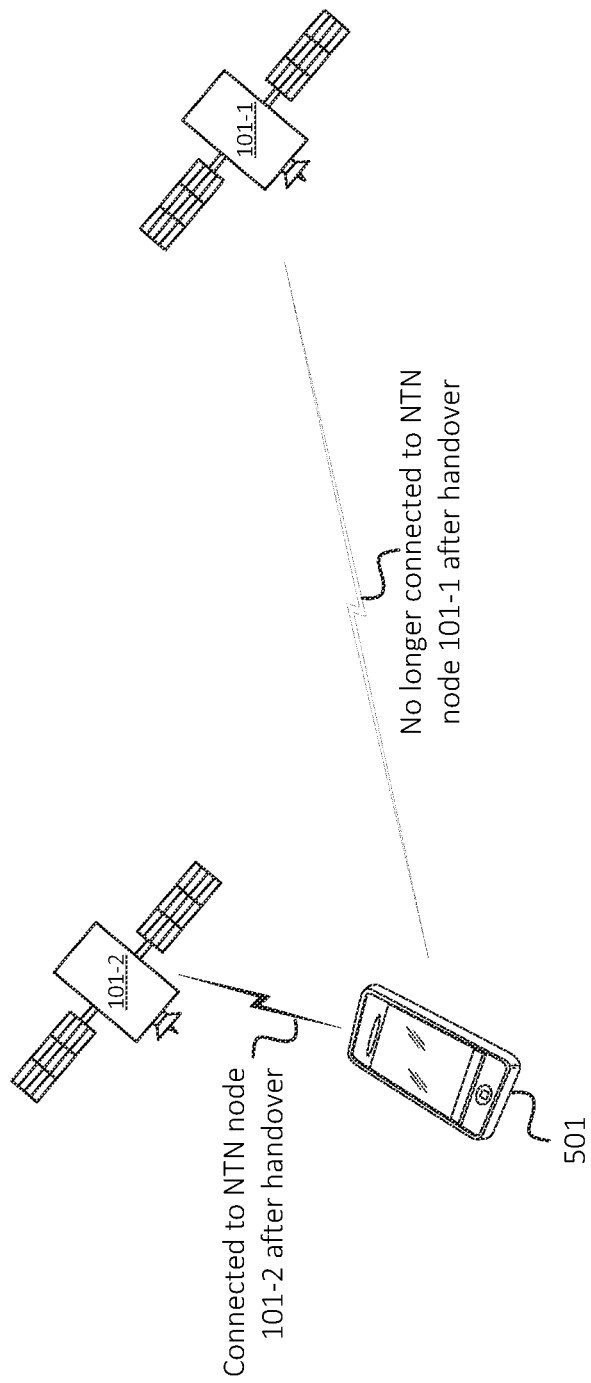
FIG. 7 illustrates an example of a UE connected to a second NTN node after initiating a handover from a first NTN node, in accordance with some embodiments.

FIGS. 6 and 7 illustrate an example handover that may be initiated by a given UE 501 when such UE 501 is currently connected to a given NTN node 101. For example, as shown in FIG. 6, UE 501 may be connected to NTN node 101-1. At some point, while UE 501 is connected to NTN node 101-1, UE 501 may detect (at 602) a handover condition. For example, UE 501 may compare group telemetry information 401 (e.g., NTN node telemetry information 201-1 associated with NTN node 101-1 and/or NTN node telemetry information 201-2 associated with NTN node 101-2), measures of signal strength or quality associated with NTN nodes 101-1 and/or 101-2, and/or other factors, to one or more NTN handover conditions 503.

In this example, UE 501 may identify, based on group telemetry information 401, a trajectory, course, heading, direction, etc. (hereinafter referred to as trajectory 601) associated with each NTN node 101. For example, UE 501 may identify trajectory 601-1 associated with NTN node 101-1, and may identify trajectory 601-2 associated with NTN node 101-2. Such trajectories 601 may indicate, in this example, that NTN node 101-1 is moving away from UE 501 (e.g., a distance between NTN node 101-1 and UE 501 may be increasing as a function of time) and that NTN node 101-2 is moving toward UE 501 (e.g., a distance between NTN node 101-2 and UE 501 may be decreasing as a function of time). In some embodiments, UE 501 may identify one or more other metrics, Key Performance Indicators ("KPIs"), events, etc. For example, UE 501 may identify that a measure of signal strength or quality (e.g., Signal-to-Interference-and-Noise-Ratio ("SINR"), Reference Signal Received Power ("RSRP"), Reference Signal Received Quality ("RSRQ"), etc.) between UE 501 and NTN node 101-1 is decreasing and/or is below a first threshold, and/or may identify that a measure of signal strength or quality between UE 501 and NTN node 101-2 is increasing and/or is above a second threshold.

Based on identifying the relative trajectories 601 of NTN nodes 101-1 and 101-2 and/or based on other factors, UE 501 may determine that a particular handover condition, associated with NTN handover conditions 503, has been met. UE 501 may further identify that NTN node 101-2 is a suitable handover target based on criteria, instructions, or actions associated with the particular determined handover condition. In some embodiments, UE 501 may identify that NTN node 101-2 is a suitable handover target based on signal strength or quality measurements performed by UE 501 (e.g., NTN node 101-2 may be a NTN node 101 with the highest measure of signal strength or quality with which UE 501 is able to wirelessly communicate). In some embodiments, UE 501 may identify that NTN node 101-2 is a suitable handover target based on one or more other techniques.

UE 501 may accordingly initiate (at 604) a handover to NTN node 101-2. For example, UE 501 may output a handover request to NTN node 101-1 and/or to NTN node 101-2, indicating NTN node 101-2 as a handover target and/or indicating NTN node 101-1 as a handover source. NTN nodes 101-1 and 101-2 may accordingly communicate with each other, with UE 501, and/or one or more other devices or systems (e.g., an Access and Mobility Management Function ("AMF"), a Mobility Management Entity ("MME"), and/or some other network function) in order to effectuate the UE-initiated handover of UE 501 from NTN node 101-1 to 101-2.

After the handover has been performed, and as shown in FIG. 7, UE 501 may be connected to NTN node 101-2 and may no longer be connected to NTN node 101-1. In some embodiments, the result of the handover may be different than the example shown in FIG. 7. For example, the handover may result in a connection between UE 501 and NTN node 101-2 being established, and a connection between UE 501 and NTN node 101-1 remaining established and/or being set to a different mode or state (e.g., an idle mode, a secondary mode, etc.).

Figure 8:
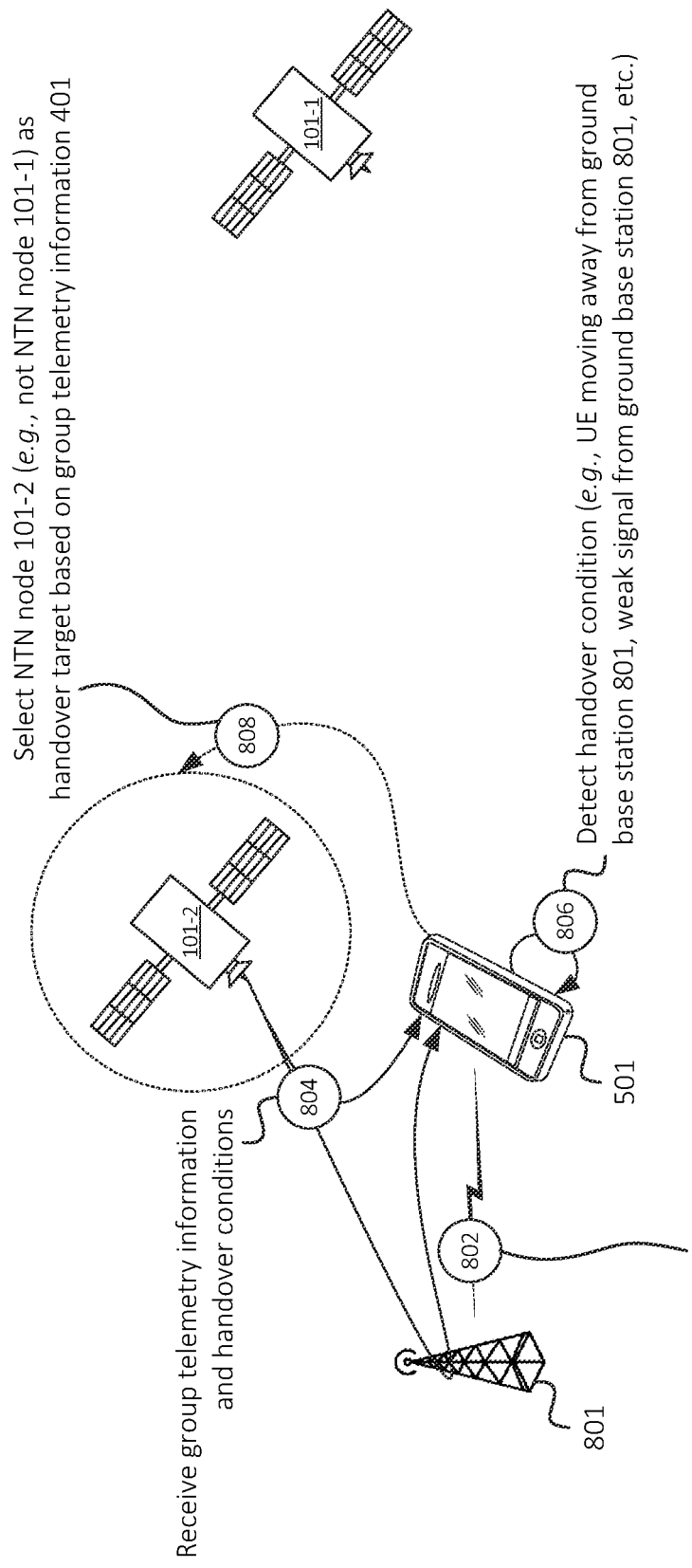
FIG. 8 illustrates an example of a UE detecting a handover condition while connected to a ground base station, and selecting a particular NTN node based on NTN group telemetry information, in accordance with some embodiments.

FIGS. 7 and 8 illustrate another example handover that may be initiated by UE 501 based on NTN node telemetry information 201 and/or group telemetry information 401 associated with one or more NTN nodes 101 and/or NTN node groups 103. As shown, UE 501 may be connected (at 802) to ground-based base station (also referred to as "ground base station") 801. For example, as discussed above, ground base station 801 may be mounted, installed, affixed, etc. to a building, a tower, a vehicle, and/or some other ground-based device or structure. UE 501 may further receive (at 804) group telemetry information 401 (e.g., NTN node telemetry information 201 associated with one or more NTN nodes 101, such as NTN nodes 101-1 and/or 101-2) and/or may receive a set of NTN handover conditions 503. For example, as discussed above with respect to FIG. 5 (at 506), UE 501 may receive group telemetry information 401 and/or NTN handover conditions 503 from one or more NTN nodes 101 (e.g., which may broadcast such information), from ground base station 801 (e.g., which may serve as a relay for such information, which may be received from NTN nodes 101 and/or from some other device or system that provides such information), and/or from some other source. For example, UE 501 may receive group telemetry information 401 on an ongoing basis, such as when NTN node telemetry information 201 associated with one or more NTN nodes 101 is updated or otherwise provided.

At some point, UE 501 may determine (at 806) a handover condition, such as detecting the UE 501 is moving away from ground base station 801, that a signal strength between UE 501 and ground base station 801 is approaching or is below a threshold measure of signal strength, that UE 501 is initiating a particular application or service type indicated in a particular set of handover conditions 503 (e.g., is initiating an emergency call, is initiating a secure message session, etc.), and/or may identify the handover condition based on one or more other UE-determined metrics or events.

Figure 9:
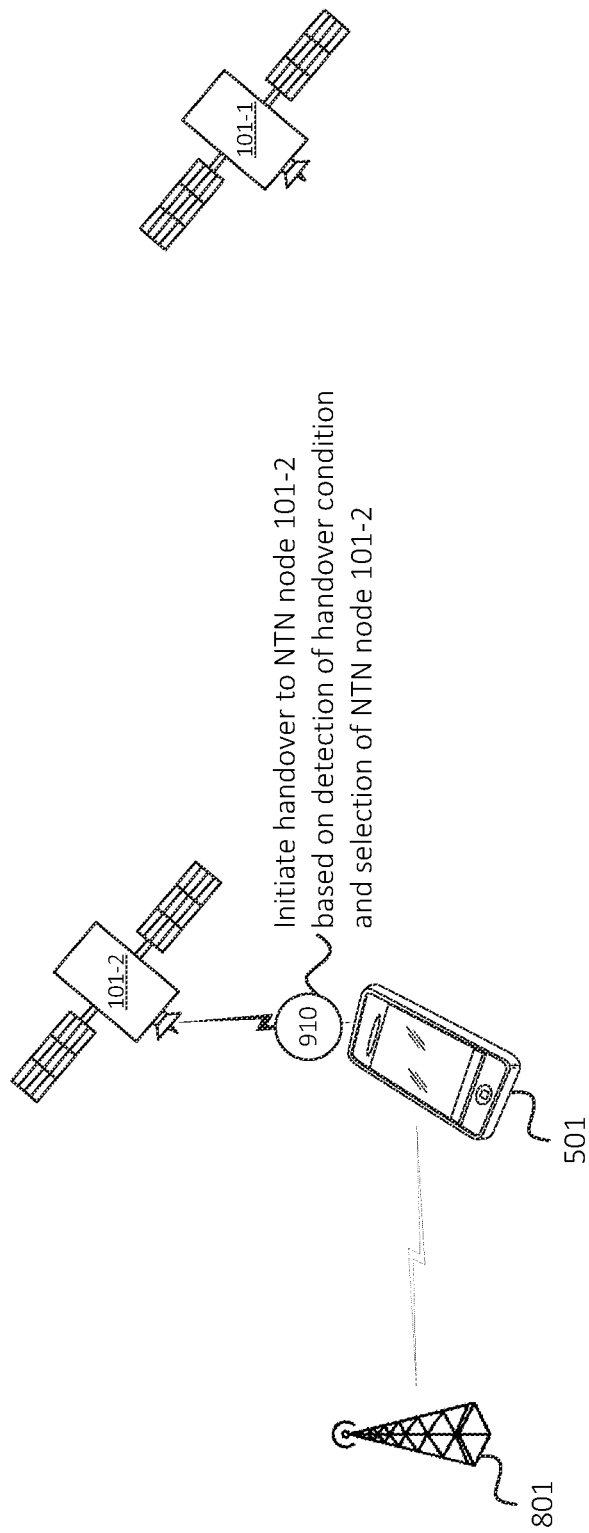
FIG. 9 illustrates an example of a UE connected to an NTN node after initiating a handover from a ground base station, in accordance with some embodiments.

UE 501 may select (at 808) NTN node 101-2 as a handover target based on determining (at 806) the handover condition. For example, UE 501 may utilize group telemetry information 401 (e.g., NTN node telemetry information 201-1 associated with NTN node 101-1 and/or NTN node telemetry information 201-2 associated with NTN node 101-2) to select (at 808) NTN node 101-2 as a handover target for UE 501. Based on group telemetry information 401, UE 501 may determine that NTN node 101-2 is closer in position to UE 501 than one or more other NTN nodes 101 (e.g., NTN node 101-1). As another example, UE 501 may receive or maintain information (e.g., from a user of UE 501) indicating a predicted or expected route (e.g., a navigation route of UE 501 from one geographical location to another), and may further identify that a trajectory of NTN node 101-2 matches the predicted or expected route of UE 501 most closely out of a set of NTN nodes 101. That is, UE 501 may select (at 808) NTN node 101-2 based on factors in addition to, or in lieu of, signal strength or quality metrics between UE 501 and NTN node 101-2, such as based on a trajectory of NTN node 101-2 and/or one or more other NTN nodes 101. Thus, as shown in FIG. 9, UE 501 may initiate (at 910) a handover from ground base station 801 to NTN node 101-2, resulting in a connection being established between UE 501 and NTN node 101-2, and a connection between UE 501 being de-established or otherwise modified based on the handover.

Figure 10:
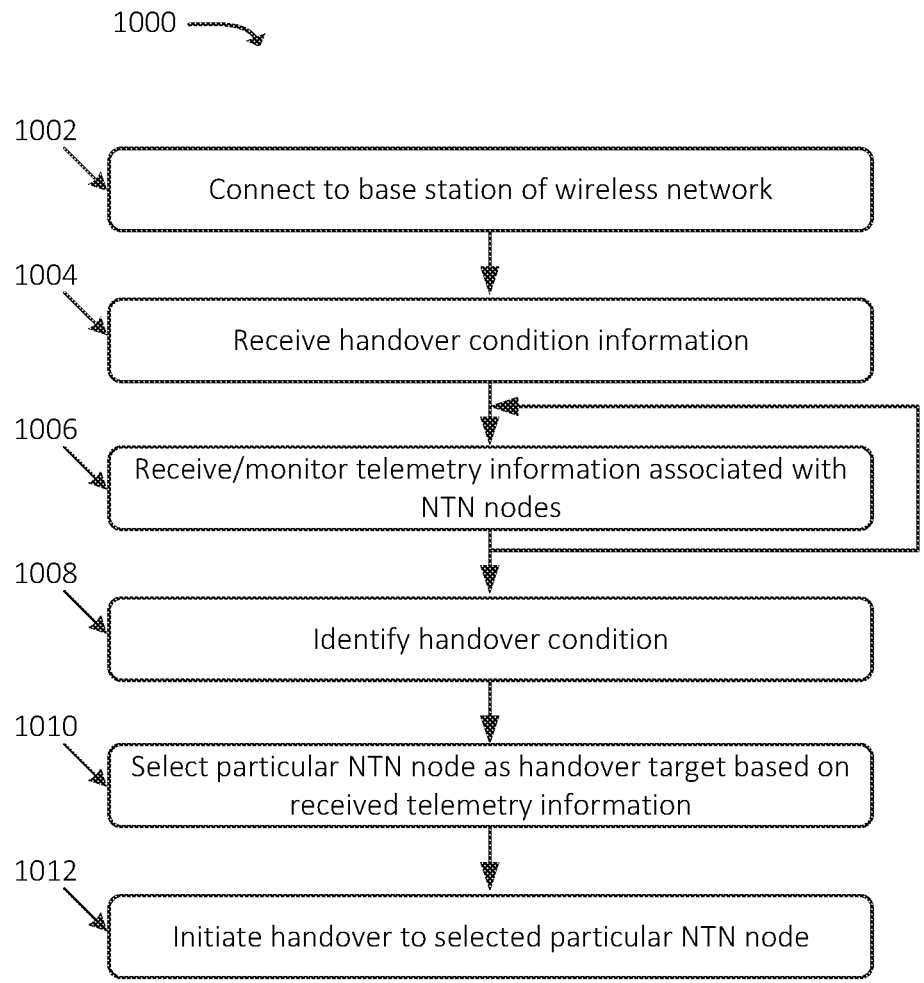
FIG. 10 illustrates an example process for performing a UE-initiated handover based on NTN node telemetry information, in accordance with some embodiments.

FIG. 10 illustrates an example process 1000 for performing a UE-initiated handover based on NTN node telemetry information. In some embodiments, some or all of process 1000 may be performed by UE 501. In some embodiments, one or more other devices may perform some or all of process 1000 in concert with, and/or in lieu of, UE 501.

As shown, process 1000 may include connecting (at 1002) to a base station of a wireless network. For example, UE 501 may connection to a base station implemented by a satellite (e.g., may connect to a particular NTN node 101) or to a ground-based base station (e.g., ground base station 801).

Process 1000 may further include receiving (at 1004) handover condition information. For example, UE 501 may receive handover conditions 503 from the base station to which UE 501 is currently connected (e.g., from NTN node 101, from ground base station 801, etc.) and/or may receive handover conditions 503 from some other source (e.g., via a broadcast or some other suitable technique). As discussed above, handover conditions 503 may include factors, criteria, conditions, thresholds, etc. based on information that may be measured, collected, etc. by UE 501. Such factors, criteria, etc. may be based on signal strength metrics measured by UE 501, a predicted or expected location of UE 501, and/or other UE-determined metrics or events. As another example, handover conditions 503 may include factors, criteria, etc. associated with NTN nodes 101, such as relative location of a given NTN node 101 to UE 501 and/or a trajectory of NTN node 101 relative to UE 501. For example, NTN handover conditions 503 may include conditions relating to whether NTN node 101 is moving towards UE 501, is moving away from UE 501, is within a threshold proximity of UE 501 for at least a threshold amount of time based on a trajectory of NTN node 101 and a predicted or estimated path of UE 501, and/or other NTN node 101 trajectory-based conditions.

Process 1000 may additionally include receiving and/or monitoring (at 1006) telemetry information associated with one or more NTN nodes 101. For example, NTN nodes 101 may maintain their own respective NTN node telemetry information 201 (e.g., "ephemeris" data) as well as NTN node telemetry information 201 associated with one or more other NTN nodes 101 (e.g., an "almanac"), such that one particular NTN node 101 may provide NTN node telemetry information 201 associated with multiple NTN nodes 101 (e.g., group telemetry information 401). As discussed above, UE 501 may receive NTN node telemetry information 201 and/or group telemetry information 401 from a particular NTN node 101 to which UE 501 is currently connected, may receive NTN node telemetry information 201 and/or group telemetry information 401 from a particular NTN node 101 to which UE 501 is not currently connected (e.g., via one or more broadcasts by the particular NTN node 101), one or more relays, and/or from some other suitable source. UE 501 may receive NTN node telemetry information 201 and/or group telemetry information 401 on an ongoing basis, such as when such information changes or when other NTN node telemetry information 201 associated with one or more other NTN nodes 101 becomes available (e.g., such NTN nodes 101 may move towards another NTN node 101 that is currently providing NTN node telemetry information 201 and/or group telemetry information 401 to UE 501).

Process 1000 may also include identifying (at 1008) a handover condition. For example, UE 501 may compare UE-determined metrics or information, NTN node telemetry information 201 associated with one or more NTN nodes 101, and/or other suitable information to handover conditions 503 and may identify that at least a particular handover condition is satisfied.

Process 1000 may further include selecting (at 1010) a particular NTN node 101 as a handover target. For example, UE 501 may select the particular NTN node 101, from a group of NTN nodes 101 for which UE 501 has received NTN node telemetry information 201, based on a trajectory of the particular NTN node 101, a location of NTN node 101, and/or one or more other factors. In some embodiments, the selected NTN node 101 may be a different NTN node 101 from which UE 501 received NTN node telemetry information 201 and/or group telemetry information 401. Generally, UE 501 may identify that the particular NTN node 101 is the closest NTN node 101 to UE 501, is predicted or estimated to be the closest NTN node 101 or within a particular distance of UE 501 for at least a threshold amount of time (e.g., based on a location of UE 501 and/or based on a predicted or estimated path or route of UE 501), and/or is otherwise a "best match" for a handover target for UE 501 based on NTN node telemetry information 201 associated with the particular NTN node 101 and/or other NTN nodes 101.

Process 1000 may additionally include initiating (at 1012) a handover to the selected NTN node 101. For example, as discussed above, UE 501 may output one or more messages to the base station to which UE 501 is currently connected, and/or may output one or more messages to the selected NTN node 101, to initiate the handover. The currently connected base station, the selected NTN node 101, and/or one or more other devices or systems may communicate in order to effectuate the handover, after which UE 501 may communicate with the wireless network via the particular NTN node 101 (e.g., may be handed over from the source base station, to which UE 501 was previously connected, to the selected NTN node 101.

Figure 11:
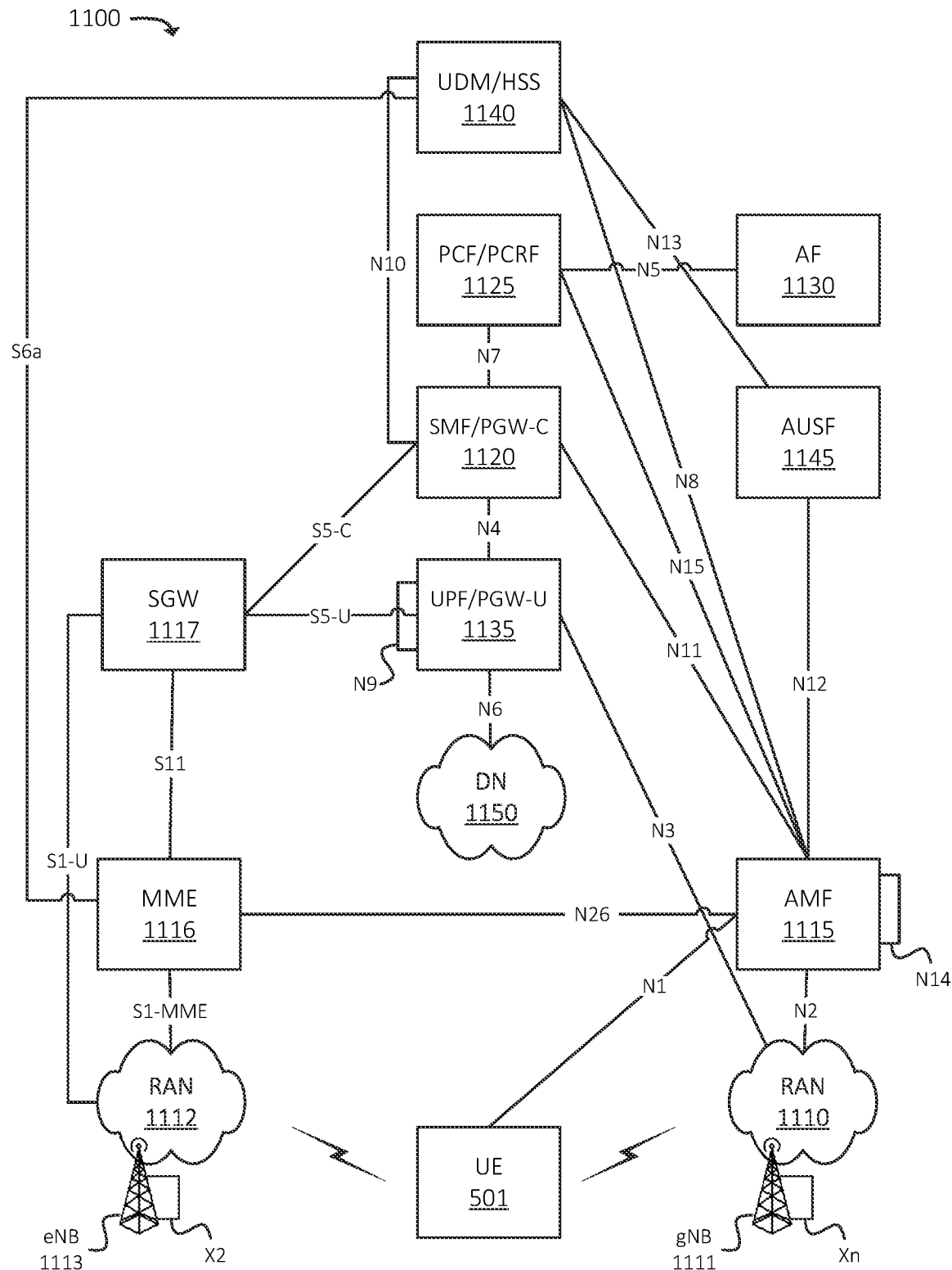
FIG. 11 illustrates an example environment in which one or more embodiments, described herein, may be implemented.

FIG. 11 illustrates an example environment 1100, in which one or more embodiments may be implemented. In some embodiments, environment 1100 may correspond to a Fifth Generation ("5G") network, and/or may include elements of a 5G network. In some embodiments, environment 1100 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 1100 may represent or may include a 5G core ("5GC"). As shown, environment 1100 may include UE 501, RAN 1110 (which may include one or more Next Generation Node Bs ("gNBs") 1111), RAN 1112 (which may include one or more evolved Node Bs ("eNBs") 1113), and various network functions such as AMF 1115, MME 1116, Serving Gateway ("SGW") 1117, Session Management Function ("SMF")/Packet Data Network ("PDN") Gateway ("PGW")-Control plane function ("PGW-C") 1120, Policy Control Function ("PCF")/Policy Charging and Rules Function ("PCRF") 1125, Application Function ("AF") 1130, User Plane Function ("UPF")/PGW-User plane function ("PGW-U") 1135, Unified Data Management ("UDM")/Home Subscriber Server ("HSS") 1140, and Authentication Server Function ("AUSF") 1145. Environment 1100 may also include one or more networks, such as Data Network ("DN") 1150.

The example shown in FIG. 11 illustrates one instance of each network component or function (e.g., one instance of SMF/PGW-C 1120, PCF/PCRF 1125, UPF/PGW-U 1135, UDM/HSS 1140, and/or AUSF 1145). In practice, environment 1100 may include multiple instances of such components or functions. For example, in some embodiments, environment 1100 may include multiple "slices" of a core network, where each slice includes a discrete and/or logical set of network functions (e.g., one slice may include a first instance of SMF/PGW-C 1120, PCF/PCRF 1125, UPF/PGW-U 1135, UDM/HSS 1140, and/or AUSF 1145, while another slice may include a second instance of SMF/PGW-C 1120, PCF/PCRF 1125, UPF/PGW-U 1135, UDM/HSS 1140, and/or AUSF 1145). The different slices may provide differentiated levels of service, such as service in accordance with different Quality of Service ("QoS") parameters.

The quantity of devices and/or networks, illustrated in FIG. 11, is provided for explanatory purposes only. In practice, environment 1100 may include additional devices and/or networks, fewer devices and/or networks, different devices and/or networks, or differently arranged devices and/or networks than illustrated in FIG. 11. For example, while not shown, environment 1100 may include devices that facilitate or enable communication between various components shown in environment 1100, such as routers, modems, gateways, switches, hubs, etc. In some implementations, one or more devices of environment 1100 may be physically integrated in, and/or may be physically attached to, one or more other devices of environment 1100. Alternatively, or additionally, one or more of the devices of environment 1100 may perform one or more network functions described as being performed by another one or more of the devices of environment 1100.

Elements of environment 1100 may interconnect with each other and/or other devices via wired connections, wireless connections, or a combination of wired and wireless connections. Examples of interfaces or communication pathways between the elements of environment 1100, as shown in FIG. 11, may include an N1 interface, an N2 interface, an N3 interface, an N4 interface, an N5 interface, an N6 interface, an N7 interface, an N8 interface, an N9 interface, an N10 interface, an N11 interface, an N12 interface, an N13 interface, an N14 interface, an N2 interface, an N26 interface, an S1-C interface, an S1-U interface, an S5-C interface, an S5-U interface, an S6a interface, an S11 interface, and/or one or more other interfaces. Such interfaces may include interfaces not explicitly shown in FIG. 11, such as Service-Based Interfaces ("SBIs"), including an Namf interface, an Nudm interface, an Npcf interface, an Nupf interface, an Nnef interface, an Nsmf interface, and/or one or more other SBIs.

UE 501 may include a computation and communication device, such as a wireless mobile communication device that is capable of communicating with RAN 1110, RAN 1112, and/or DN 1150. UE 501 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 501 may send traffic to and/or receive traffic (e.g., user plane traffic) from DN 1150 via RAN 1110, RAN 1112, and/or UPF/PGW-U 1135.

RAN 1110 may be, or may include, a 5G RAN that includes one or more base stations (e.g., one or more gNBs 1111), via which UE 501 may communicate with one or more other elements of environment 1100. UE 501 may communicate with RAN 1110 via an air interface (e.g., as provided by gNB 1111). For instance, RAN 1110 may receive traffic (e.g., user plane traffic such as voice call traffic, data traffic, messaging traffic, etc.) from UE 501 via the air interface, and may communicate the traffic to UPF/PGW-U 1135 and/or one or more other devices or networks. Further, RAN 1110 may receive signaling traffic, control plane traffic, etc. from UE 501 via the air interface, and may communicate such signaling traffic, control plane traffic, etc. to AMF 1115 and/or one or more other devices or networks.

Additionally, RAN 1110 may receive traffic intended for UE 501 (e.g., from UPF/PGW-U 1135, AMF 1115, and/or one or more other devices or networks) and may communicate the traffic to UE 501 via the air interface. In some embodiments, ground base station 801 may be, may include, and/or may be implemented by one or more gNBs 1111. In some embodiments, one or more NTN nodes 101 may be, may include, may implement, etc. one or more gNBs 1111. As such, RAN 1110 may include one or more ground base stations 801 and/or one or more NTN nodes 101.

RAN 1112 may be, or may include, a LTE RAN that includes one or more base stations (e.g., one or more eNBs 1113), via which UE 501 may communicate with one or more other elements of environment 1100. UE 501 may communicate with RAN 1112 via an air interface (e.g., as provided by eNB 1113). For instance, RAN 1112 may receive traffic (e.g., user plane traffic such as voice call traffic, data traffic, messaging traffic, signaling traffic, etc.) from UE 501 via the air interface, and may communicate the traffic to UPF/PGW-U 1135 (e.g., via SGW 1117) and/or one or more other devices or networks. Further, RAN 1112 may receive signaling traffic, control plane traffic, etc. from UE 501 via the air interface, and may communicate such signaling traffic, control plane traffic, etc. to MME 1116 and/or one or more other devices or networks. Additionally, RAN 1112 may receive traffic intended for UE 501 (e.g., from UPF/PGW-U 1135, MME 1116, SGW 1117, and/or one or more other devices or networks) and may communicate the traffic to UE 501 via the air interface. In some embodiments, ground base station 801 may be, may include, and/or may be implemented by one or more eNBs 1113. In some embodiments, one or more NTN nodes 101 may be, may include, may implement, etc. one or more eNBs 1113. As such, RAN 1112 may include one or more ground base stations 801 and/or one or more NTN nodes 101.

AMF 1115 may include one or more devices, systems, Virtualized Network Functions ("VNFs"), Cloud-Native Network Functions ("CNFs"), etc., that perform operations to register UE 501 with the 5G network, to establish bearer channels associated with a session with UE 501, to hand off UE 501 from the 5G network to another network, to hand off UE 501 from the other network to the 5G network, manage mobility of UE 501 between RANs 1110 and/or gNBs 1111, and/or to perform other operations. In some embodiments, the 5G network may include multiple AMFs 1115, which communicate with each other via the N14 interface (denoted in FIG. 11 by the line marked "N14" originating and terminating at AMF 1115).

MME 1116 may include one or more devices, systems, VNFs, CNFs, etc., that perform operations to register UE 501 with the EPC, to establish bearer channels associated with a session with UE 501, to hand off UE 501 from the EPC to another network, to hand off UE 501 from another network to the EPC, manage mobility of UE 501 between RANs 1112 and/or eNBs 1113, and/or to perform other operations.

SGW 1117 may include one or more devices, systems, VNFs, CNFs, etc., that aggregate traffic received from one or more eNBs 1113 and send the aggregated traffic to an external network or device via UPF/PGW-U 1135. Additionally, SGW 1117 may aggregate traffic received from one or more UPF/PGW-Us 1135 and may send the aggregated traffic to one or more eNBs 1113. SGW 1117 may operate as an anchor for the user plane during inter-eNB handovers and as an anchor for mobility between different telecommunication networks or RANs (e.g., RANs 1110 and 1112).

SMF/PGW-C 1120 may include one or more devices, systems, VNFs, CNFs, etc., that gather, process, store, and/or provide information in a manner described herein. SMF/PGW-C 1120 may, for example, facilitate the establishment of communication sessions on behalf of UE 501. In some embodiments, the establishment of communications sessions may be performed in accordance with one or more policies provided by PCF/PCRF 1125.

PCF/PCRF 1125 may include one or more devices, systems, VNFs, CNFs, etc., that aggregate information to and from the 5G network and/or other sources. PCF/PCRF 1125 may receive information regarding policies and/or subscriptions from one or more sources, such as subscriber databases and/or from one or more users (such as, for example, an administrator associated with PCF/PCRF 1125).

AF 1130 may include one or more devices, systems, VNFs, CNFs, etc., that receive, store, and/or provide information that may be used in determining parameters (e.g., quality of service parameters, charging parameters, or the like) for certain applications.

UPF/PGW-U 1135 may include one or more devices, systems, VNFs, CNFs, etc., that receive, store, and/or provide data (e.g., user plane data). For example, UPF/PGW-U 1135 may receive user plane data (e.g., voice call traffic, data traffic, etc.), destined for UE 501, from DN 1150, and may forward the user plane data toward UE 501 (e.g., via RAN 1110, SMF/PGW-C 1120, and/or one or more other devices). In some embodiments, multiple UPFs 1135 may be deployed (e.g., in different geographical locations), and the delivery of content to UE 501 may be coordinated via the N9 interface (e.g., as denoted in FIG. 11 by the line marked "N9" originating and terminating at UPF/PGW-U 1135). Similarly, UPF/PGW-U 1135 may receive traffic from UE 501 (e.g., via RAN 1110, RAN 1112, SMF/PGW-C 1120, and/or one or more other devices), and may forward the traffic toward DN 1150. In some embodiments, UPF/PGW-U 1135 may communicate (e.g., via the N4 interface) with SMF/PGW-C 1120, regarding user plane data processed by UPF/PGW-U 1135.

UDM/HSS 1140 and AUSF 1145 may include one or more devices, systems, VNFs, CNFs, etc., that manage, update, and/or store, in one or more memory devices associated with AUSF 1145 and/or UDM/HSS 1140, profile information associated with a subscriber. AUSF 1145 and/or UDM/HSS 1140 may perform authentication, authorization, and/or accounting operations associated with the subscriber and/or a communication session with UE 501.

DN 1150 may include one or more wired and/or wireless networks. For example, DN 1150 may include an Internet Protocol ("IP")-based PDN, a wide area network ("WAN") such as the Internet, a private enterprise network, and/or one or more other networks. UE 501 may communicate, through DN 1150, with data servers, other UEs 501, and/or to other servers or applications that are coupled to DN 1150. DN 1150 may be connected to one or more other networks, such as a public switched telephone network ("PSTN"), a public land mobile network ("PLMN"), and/or another network. DN 1150 may be connected to one or more devices, such as content providers, applications, web servers, and/or other devices, with which UE 501 may communicate.

Figure 12:
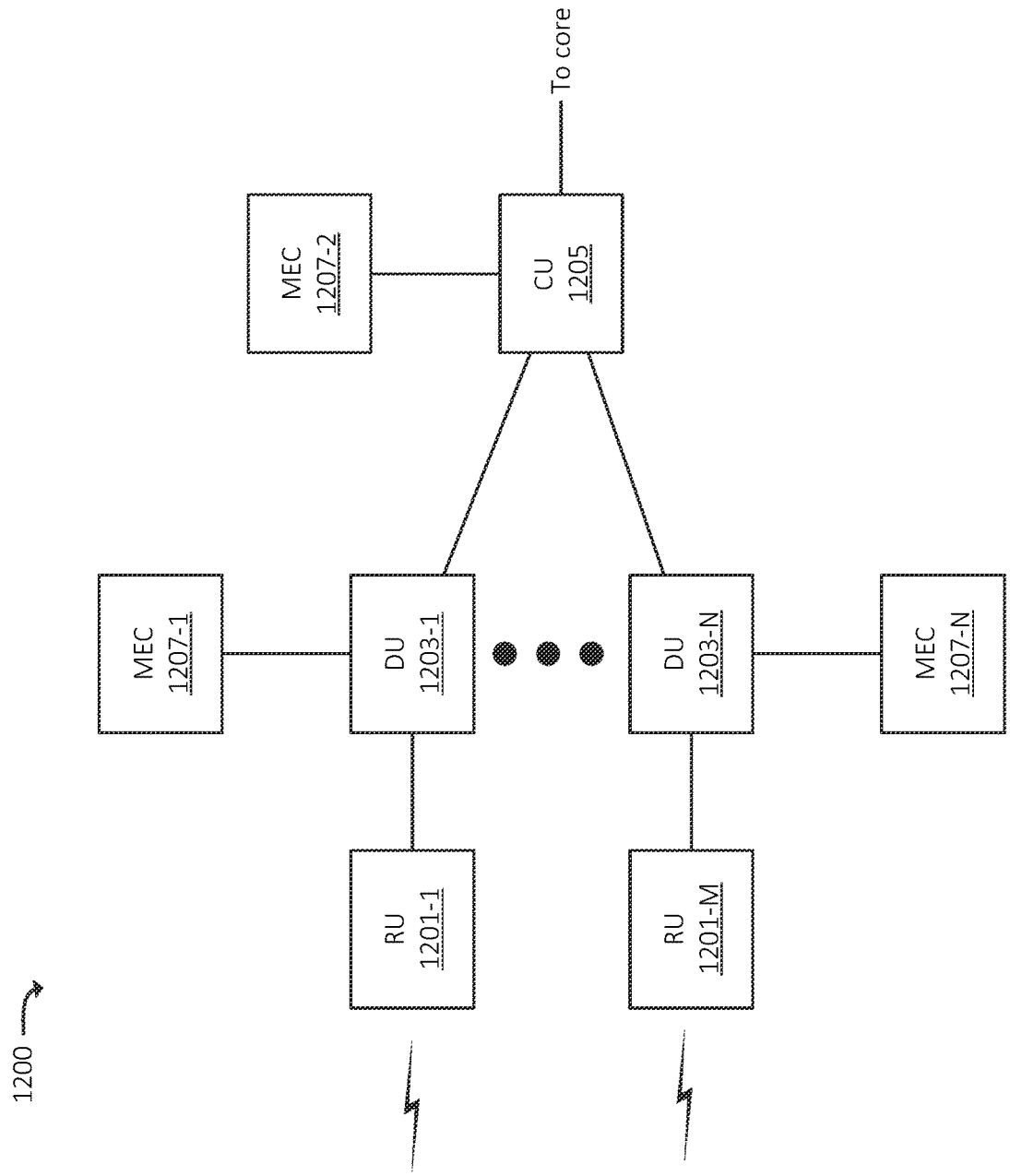
FIG. 12 illustrates an example arrangement of a radio access network ("RAN"), in accordance with some embodiments.

FIG. 12 illustrates an example RAN environment 1200, which may be included in and/or implemented by one or more RANs (e.g., RAN 1110, RAN 1112, or some other RAN). In some embodiments, a particular RAN may include one RAN environment 1200. In some embodiments, a particular RAN may include multiple RAN environments 1200. In some embodiments, RAN environment 1200 may correspond to a particular gNB 1111 of a 5G RAN (e.g., RAN 1110). In some embodiments, RAN environment 1200 may correspond to multiple gNBs 1111. In some embodiments, RAN environment 1200 may correspond to one or more other types of base stations of one or more other types of RANs. As shown, RAN environment 1200 may include Central Unit ("CU") 1205, one or more Distributed Units ("DUs") 1203-1 through 1203-N (referred to individually as "DU 1203," or collectively as "DUs 1203"), and one or more Radio Units ("RUs") 1201-1 through 1201-M (referred to individually as "RU 1201," or collectively as "RUs 1201").

CU 1205 may communicate with a core of a wireless network (e.g., may communicate with one or more of the devices or systems described above with respect to FIG. 11, such as AMF 1115 and/or UPF/PGW-U 1135). In the uplink direction (e.g., for traffic from UEs 501 to a core network), CU 1205 may aggregate traffic from DUs 1203, and forward the aggregated traffic to the core network. In some embodiments, CU 1205 may receive traffic according to a given protocol (e.g., Radio Link Control ("RLC")) from DUs 1203, and may perform higher-layer processing (e.g., may aggregate/process RLC packets and generate Packet Data Convergence Protocol ("PDCP") packets based on the RLC packets) on the traffic received from DUs 1203.

In accordance with some embodiments, CU 1205 may receive downlink traffic (e.g., traffic from the core network) for a particular UE 501, and may determine which DU(s) 1203 should receive the downlink traffic. DU 1203 may include one or more devices that transmit traffic between a core network (e.g., via CU 1205) and UE 501 (e.g., via a respective RU 1201). DU 1203 may, for example, receive traffic from RU 1201 at a first layer (e.g., physical ("PHY") layer traffic, or lower PHY layer traffic), and may process/aggregate the traffic to a second layer (e.g., upper PHY and/or RLC). DU 1203 may receive traffic from CU 1205 at the second layer, may process the traffic to the first layer, and provide the processed traffic to a respective RU 1201 for transmission to UE 501.

RU 1201 may include hardware circuitry (e.g., one or more RF transceivers, antennas, radios, and/or other suitable hardware) to communicate wirelessly (e.g., via an RF interface) with one or more UEs 501, one or more other DUs 1203 (e.g., via RUs 1201 associated with DUs 1203), and/or any other suitable type of device. In the uplink direction, RU 1201 may receive traffic from UE 501 and/or another DU 1203 via the RF interface and may provide the traffic to DU 1203. In the downlink direction, RU 1201 may receive traffic from DU 1203, and may provide the traffic to UE 501 and/or another DU 1203.

One or more elements of RAN environment 1200 may, in some embodiments, be communicatively coupled to one or more Multi-Access/Mobile Edge Computing ("MEC") devices, referred to sometimes herein simply as "MECs" 1207. For example, DU 1203-1 may be communicatively coupled to MEC 1207-1, DU 1203-N may be communicatively coupled to MEC 1207-N, CU 1205 may be communicatively coupled to MEC 1207-2, and so on. MECs 1207 may include hardware resources (e.g., configurable or provisionable hardware resources) that may be configured to provide services and/or otherwise process traffic to and/or from UE 501, via a respective RU 1201.

For example, DU 1203-1 may route some traffic, from UE 501, to MEC 1207-1 instead of to a core network via CU 1205. MEC 1207-1 may process the traffic, perform one or more computations based on the received traffic, and may provide traffic to UE 501 via RU 1201-1. In some embodiments, MEC 1207 may include, and/or may implement, some or all of the functionality described above with respect to AF 1130, UPF 1135, and/or one or more other devices, systems, VNFs, CNFs, etc. In this manner, ultra-low latency services may be provided to UE 501, as traffic does not need to traverse DU 1203, CU 1205, links between DU 1203 and CU 1205, and an intervening backhaul network between RAN environment 1200 and the core network.

Figure 13:
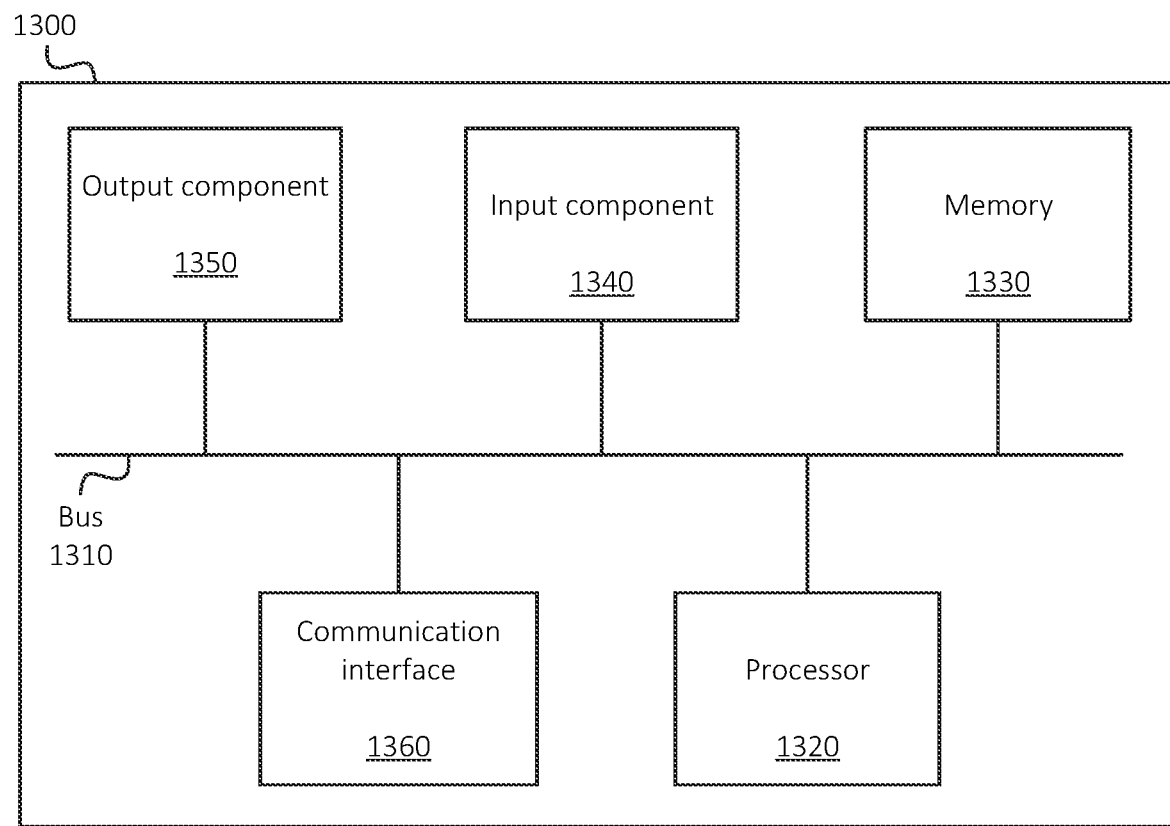
FIG. 13 illustrates example components of one or more devices, in accordance with one or more embodiments described herein.

FIG. 13 illustrates example components of device 1300. One or more of the devices described above may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. In some embodiments, processor 1320 may be or may include one or more hardware processors. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300 and/or other receives or detects input from a source external to input component 1340, such as a touchpad, a touchscreen, a keyboard, a keypad, a button, a switch, a microphone or other audio input component, etc. In some embodiments, input component 1340 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-10), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
  one or more processors configured to:
    connect to a base station of a wireless network;
    receive, from a first Non-Terrestrial Network ("NTN") node of a plurality of NTN nodes, telemetry information associated with the plurality of NTN nodes, wherein the received telemetry information is broadcasted from the first NTN node and is received by the device without connecting to the first NTN node, wherein the received telemetry information includes:
      first telemetry information associated with the first NTN node, and
      second telemetry information associated with a second NTN node of the plurality of NTN nodes;
    determine, based on the first telemetry information, that a distance between the device and the first NTN node is increasing as a function of time;
    determine, based on the second telemetry information, that a distance between the device and the second NTN node is decreasing as a function of time;
    identify a particular handover condition;
    select, based on identifying the particular handover condition, a particular NTN node of the plurality of NTN nodes, wherein selecting the particular NTN node includes selecting the second NTN node based on determining that the distance between the device and the first NTN node is increasing as a function of time and further based on determining that the distance between the device and the second NTN node is decreasing as a function of time;
    initiate a handover procedure from the base station of the wireless network to the second NTN node; and
    connect to the second NTN node based on the handover procedure.

2. The device of claim 1, wherein the plurality of NTN nodes are implemented by a plurality of satellites.

3. The device of claim 2, wherein the plurality of satellites each orbit the Earth.

4. The device of claim 2, wherein each NTN node, of the plurality of NTN nodes, is implemented by a respective particular satellite of the plurality of satellites.

5. The device of claim 1, wherein the telemetry information associated with the plurality of NTN nodes includes, for each NTN node, at least one of:
  a current position of the each NTN node, a timestamp associated with the current position of the each NTN node,
a trajectory of the each NTN node, or
a timestamp associated with the trajectory of the each NTN node.

6. The device of claim 1, wherein the one or more processors are further configured to:
determine a predicted route of the device,
wherein determining that the distance between the device and the first NTN node is increasing as a function of time or that the distance between the device and the second NTN node is decreasing as a function of time is based on the predicted route of the device.

7. A non-transitory computer-readable medium, storing a plurality of processor-executable instructions to:
connect to a base station of a wireless network;
receive, from a first Non-Terrestrial Network ("NTN") node of a plurality of NTN nodes, telemetry information associated with the plurality of NTN nodes, wherein the received telemetry information is broadcasted from the first NTN node and is received by the device without connecting to the first NTN node, wherein the received telemetry information includes:
first telemetry information associated with the first NTN node, and
second telemetry information associated with a second NTN node of the plurality of NTN nodes;
determine, based on the first telemetry information, that a distance between a device and the first NTN node is increasing as a function of time;
determine, based on the second telemetry information, that a distance between the device and the second NTN node is decreasing as a function of time;
identify a particular handover condition;
select, based on identifying the particular handover condition, a particular NTN node of the plurality of NTN nodes, wherein selecting the particular NTN node includes selecting the second NTN node based on determining that the distance between the device and the first NTN node is increasing as a function of time and further based on determining that the distance between the device and the second NTN node is decreasing as a function of time;
initiate a handover procedure from the base station of the wireless network to the second NTN node; and
connect to the second NTN node based on the handover procedure.

8. The non-transitory computer-readable medium of claim 7, wherein the plurality of NTN nodes are implemented by a plurality of satellites.

9. The non-transitory computer-readable medium of claim 8, wherein the plurality of satellites each orbit the Earth.

10. The non-transitory computer-readable medium of claim 8, wherein each NTN node, of the plurality of NTN nodes, is implemented by a respective particular satellite of the plurality of satellites.

11. The non-transitory computer-readable medium of claim 7, wherein the telemetry information associated with the plurality of NTN nodes includes, for each NTN node, at least one of:
a current position of the each NTN node,
a timestamp associated with the current position of the each NTN node,
a trajectory of the each NTN node, or
a timestamp associated with the trajectory of the each NTN node.

12. The non-transitory computer-readable medium of claim 7, wherein the plurality of processor-executable instructions further include processor-executable instructions to:
determine a predicted route of the device,
wherein determining that the distance between the device and the first NTN node is increasing as a function of time or that the distance between the device and the second NTN node is decreasing as a function of time is based on the predicted route of the device.

13. A method, comprising:
connecting to a base station of a wireless network;
receiving, from a first Non-Terrestrial Network ("NTN") node of a plurality of NTN nodes, telemetry information associated with the plurality of NTN nodes, wherein the received telemetry information is broadcasted from the first NTN node and is received by the device without connecting to the first NTN node, wherein the received telemetry information includes:
first telemetry information associated with the first NTN node, and
second telemetry information associated with a second NTN node of the plurality of NTN nodes;
determining, based on the first telemetry information, that a distance between a device and the first NTN node is increasing as a function of time;
determining, based on the second telemetry information, that a distance between the device and the second NTN node is decreasing as a function of time;
identifying a particular handover condition;
selecting, based on identifying the particular handover condition, a particular NTN node of the plurality of NTN nodes, wherein selecting the particular NTN node includes selecting the second NTN node based on determining that the distance between the device and the first NTN node is increasing as a function of time and further based on determining that the distance between the device and the second NTN node is decreasing as a function of time;
initiating a handover procedure from the base station of the wireless network to the second NTN node; and
connecting to the second NTN node based on the handover procedure.

14. The method of claim 13, wherein the plurality of NTN nodes are implemented by a plurality of satellites.

15. The method of claim 14, wherein the plurality of satellites each orbit the Earth.

16. The method of claim 14, wherein each NTN node, of the plurality of NTN nodes, is implemented by a respective particular satellite of the plurality of satellites.

17. The method of claim 13, wherein the telemetry information associated with the plurality of NTN nodes includes, for each NTN node, at least one of:
a current position of the each NTN node,
a timestamp associated with the current position of the each NTN node,
a trajectory of the each NTN node, or
a timestamp associated with the trajectory of the each NTN node.

18. The method of claim 13, further comprising:
determining a predicted route of the device,
wherein determining that the distance between the device and the first NTN node is increasing as a function of time or that the distance between the device and the second NTN node is decreasing as a function of time is based on the predicted route of the device.

\* \* \* \* \*